United States Patent [19]

Yagitani et al.

[11] 4,327,395

[45] Apr. 27, 1982

[54] METALLIZED POLYPROPYLENE FILM CAPACITOR

[75] Inventors: Takayuki Yagitani, Nishinomiya; Osamu Ebisu, Osaka, both of Japan

[73] Assignee: Shizuki Electric Co., Inc., Nishinomiya, Japan

[21] Appl. No.: 187,078

[22] Filed: Sep. 15, 1980

[51] Int. Cl.³ .............................................. H01G 4/02
[52] U.S. Cl. .................................. 361/326; 361/314; 361/327
[58] Field of Search ................ 361/314, 326, 327, 279

[56] References Cited

U.S. PATENT DOCUMENTS

| 917,018 | 4/1909 | Dempstor | 361/327 |
|---|---|---|---|
| 3,335,343 | 8/1967 | Moore | 361/326 X |
| 3,450,968 | 6/1969 | Cox | 361/314 X |

FOREIGN PATENT DOCUMENTS 8698 3/1980 European Pat. Off. ............ 361/279

Primary Examiner—Elliot A. Goldberg
Attorney, Agent, or Firm—Wenderoth, Lind & Ponack

[57] ABSTRACT

A container contains a metallized polypropylene capacitor that has electronegative gas occupying a majority of the space between its plates. The electronegative gas is not combined with a liquid. The remaining space in the container is occupied by coolant oil which can contain a gas.

10 Claims, 4 Drawing Figures

METALLIZED POLYPROPYLENE FILM CAPACITOR

BACKGROUND OF THE INVENTION

This invention relates to a metallized film capacitor used for in alternating current, and more particularly to such capacitor constructed with dry film capacitor bodies employing a vegetable oil as a coolant.

A wound or coiled capacitor body having a dielectric of polypropylene film with no liquid impregnant and using vapor-deposited electrodes on the film is sealed in a plastic or metal case. Such a capacitor unit is referred to as "dry film capacitor" and has been widely used in alternating current with normal current frequencies.

The application of peak voltages above 300 volts across this type of capacitor can result in partial discharge in the pocket of air trapped within film layers, causing localized damage to the film and the metallization. To avoid these disadvantages, thorough impregnation of an insulating oil throughout the wound body is essentially required.

However, thorough impregnation in a wound capacitor body has been difficult to achieve in a normal manufacturing process. Insulating gas impregnation in the wound body instead of insulating oil impregnation is available to conquer this difficulty. Moreover, using an electronegative gas, for example sulfur hexafluoride (SF6), as an insulating gas is more effective to gain a higher corona starting voltage than using common gases.

In general, the cooling effect in a gas medium is inferior to that in a liquid medium. Thus, the temperature rise in a wound body of a dry film capacitor of large power rating becomes too high to be acceptable, even though the dielectric loss of polypropylene is so slight.

Using vegetable oils as a coolant for polypropylene film wound capacitor bodies makes it possible to obtain effective cooling. Vegetable oils scarcely swell the polypropylene film, while insulating oils derived from petrochemical oils or synthetic hydrocarbon oils can easily swell the polypropylene film.

The swelling of the polypropylene film causes weakening of the end connection between the deposited electrode and the metal sprayed at the end, terminating in open circuits under severe conditions.

Vegetable oils mentioned above are needed to be dissolved with SF6 gas to the saturation point, after degassing the dissolved air in them, in order to prevent the gas diffusion from the wound body to oil.

In this invention, prior to loading a vegetable oil into the space between the wound bodies and the capacitor case, SF6 gas is introduced into the wound bodies to the appropriate degree of the gas pressure. Then the vegetable oil is prohibited from penetrating into the wound bodies by a stopping action due to the gas pressure.

The intentional rejection of the oil from thin gaps between film layers provides a preferable effect on clearing action of metallized film capacitors. The problems associated with clearing action by which the metallized electrode melts away from the point of breakthrough or short is deterioration of adjacent materials which in turn triggers further breakdown and tends to produce a catastrophic or avalanche result. A material such as vegetable oil is more subject to deteriorate by the clearing action than the material such as SF6

The dry wound capacitor with SF6 exhibits preferable results on the electric characteristics; corona starting voltage and breakdown voltage.

Along with these advantages, the total processing time of the gas impregnation and the coolant loading is comparatively less than is required for impregnation of the insulating oil by the prior art.

SUMMARY OF THE INVENTION

It is an object of the present invention to reduce the deterioration of adjacent material at the clearing point and thus to obtain an unalterably regenerative capacitor.

A further object is to produce, in a relatively short time, a metallized polypropylene film capacitor characterized by a stable corona starting voltage.

A still further object is to produce metallized polypropylene capacitors having steady end connection and efficient heat transfer.

Still further objects of this invention will become apparent from the following description and claims when considered in association with the drawing.

DETAILED DESCRIPTION OF THE INVENTION

Capacitor assemblies in accordance with the present invention may be constructed and assembled by a number of well-known methods and arrangements except for employing an electronegative gas as an insulating gas between dielectric layers and a vegetable oil as a coolant.

Figure 1:
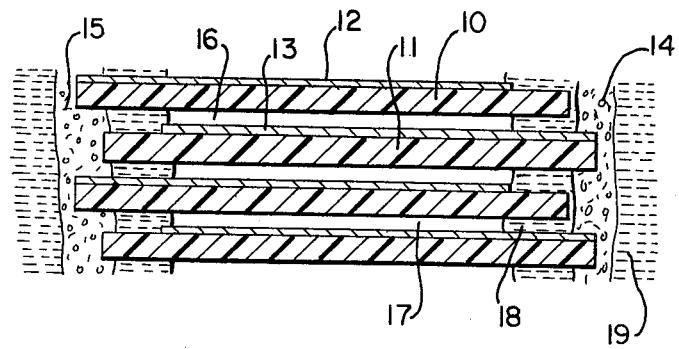
FIG. 1 is a greatly enlarged schematic sectional view of the successive layers of a wound body by which the present invention is embodied.

FIG. 1 illustrates a portion of cross-section of a wound body of a capacitor of the present invention. The insulating films of polypropylene 10 and 11 are provided on the surface with self-healing metal 12 and 13 respectively to form one pair electrodes. The metallized polypropylene film as arranged in the drawing is wound with the desired tension to form the wound body with the desired compactness.

After winding, a melted metal is sprayed on the end of the wound body to lead out the electrode out to terminals. In FIG. 1, the numerals 14 and 15 represent a sprayed metal at the end of the wound body for the termination of the electrode. The wound bodies are encased within a metal case.

Figure 2:
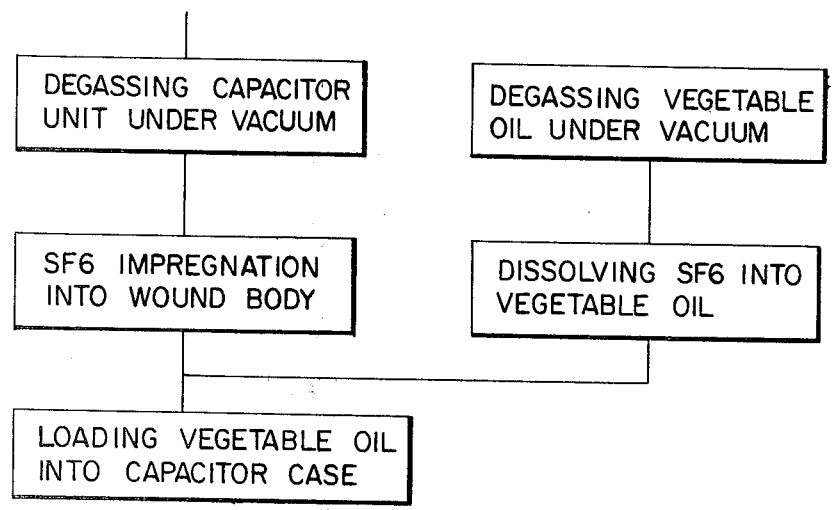
FIG. 2 illustrates a flow chart of the method of the present invention of producing a dry wound body with a vegetable oil coolant.

According to the process flow-chart illustrated in FIG. 2, impregnation of SF6 into wound bodies and loading of vegetable oil into a capacitor case are carried out. The capacitor units are evacuated in a vacuum tank to purge the residual gases on the film under the vacuum pressure of less than 0.1 torr and the tank temperatures holding from 80° C. to 100° C.

After finishing gas purging, SF6 gas is introduced into the vacuum tank up to the gas pressure ranging from 100 torr up to 600 torr, depending upon the thickness and width of the metallized film and the case size. Thorough impregnation of the gas can be accomplished in less than 2 hours.

Prior in the injection of a vegetable oil to the vacuum tank, the oil is sprayed into a degassing room which is kept in the vacuum pressure at less than 1 torr, to purge the dissolved gases in the oil. Following the degassing process, the oil is sprayed in to a gas dissolution tank which is held at a gas pressure ranging from 600 torr to 1,000 torr. The oil is circulated to the dissolution tank to the storage tank, until the saturation of the oil with SF6 is accomplished. About 30% of the oil by volume of SF6 is dissolved at the saturation point at atmospheric pressure and room temperature. The vegetable oil saturated with the gas is transferred to the vacuum tank where the capacitor units have been placed under the impregnating gas pressure. As the oil is transferred to the vacuum tank, the oil level in the tank goes up with increasing the gas pressure in the upper space of the tank. Then, a desired gas pressure regulation is required. At the end of the process, the oil level is sufficiently above the oil-inlet of the capacitor units, to allow the capacitor case to be filled with the oil. The tank is opened upon finishing the oil filling, and the oil-inlet is sealed in so short time that the gas cannot diffuse away.

The process mentioned above or illustrated in FIG. 2 realize a capacitor impregnated with SF6 gas between metallized polypropylene film layers of the wound bodies filled with a vegetable oil coolant into the space inside the capacitor case, excluding the wound bodies.

In FIG. 1 the regions 16 and 17 illustrate SF6 gas area between the layers, and areas 18 and 19 the vegetable oil. As shown by the numeral 18, the vegetable oil partially penetrates into the layers near the end. Especially when voltages are applied across the electrodes, the oil is pulled more and more into the layers by the dielectric stress force, until the pulling force is counter-balanced with the pushing force due to the gas pressure inside the layers.

The reason for employing SF6 as an insulating substance is to obtain a higher corona starting voltage capacitor than a conventional air-dry one.

Figure 3:
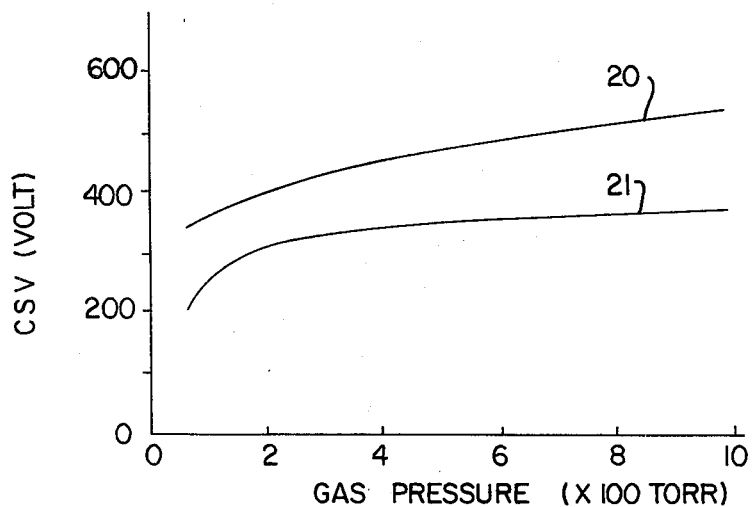
FIG. 3 is a diagram showing corona starting voltage of a metallized polypropylene film capacitor coming from 12 $\mu$m film in thickness versus impregnating gas pressure of dry air and SF6, when a coolant is omitted.

FIG. 3 shows, as an example, the corona starting voltage characteristic against gas pressures of different gases, dry-air and SF6, on the metallized polypropylene capacitors wound with the film of 12 μm in thickness. Numerals 20 and 21 represent the curves of CSV for SF6 and dry air respectively. With reference to FIG. 3, the advantage of employing SF6 for higher CSV realization is distinctly understood. Electronegative gases other than SF6 may be employed as an insulating substance for this objective. However, SF6 is the most preferable substance from the point of electrical and chemical stabilities, and moreover from the point of economy and feasibility. Furthermore, mixed gases blended with other insulating gases to SF6 are sometimes one of the most preferable substances for this use. For instance, the capacitor having wound bodies rolled with metallized polypropylene film of 9 μm in thickness impregnated with mixed gas of 50% nitrogen and 50% SF6 presents only a 6% decreases of CSV value against the same construction capacitor impregnated with 100% SF6, while the gas cost of the mixed gas can be reduced by over 48% compared with 100% of SF6 gas.

For comparison purposes, three groups, each comprising twenty capacitors, are prepared for a voltage and current test. Each capacitor unit is provided with one wound body convolutely rolled together with two sheets of metallized polypropylene film of 9 μm in thickness, having a rating of twenty microfarads. All capacitor units are assembled and constructed in the same manner except for the manner of impregnation. As a matter of convenience, the three groups are identified by letters of A, B and C.

A-group is treated in accordance with the process illustrated in FIG. 2. In this group, rapeseed oil, which is one of vegetable oils is used as coolant material and SF6 gas are impregnated into the wound body at 500 torr of the gas pressure.

B-group is prepared in the same manner as A-group, except for the kind of coolant material. In this case, low viscosity poly-isobutylene which is one of synthetic hydrocarbon oil derived from petrochemicals is used as a coolant material. Impregnation gas pressure of SF6 is the same as in A-group. Prior to filling the coolant into the capacitor can, $SF_6$ is dissolved therein to the saturation point.

C-group is prepared in the same manner as a conventional oil impregnated capacitor by prior art. A bit of SF6 is never used in this group. Low viscosity polyisobutylene oil which is the same material used as the coolant for B-group is thoroughly impregnated into the wound body as in insulating and coolant oil in this case.

Sixteen capacitor units out of twenty from the three groups each are presented for a voltage test. All the test units are then subjected to slowly increasing voltage. At approximate 1500 volts, clearing begins to be audible in all the units. After stabilization, the voltage further increased, with random clearing occurring in all the units of every group. By about 2500 volts, half of all the units of C-group are completely shorted out, while none of the units of A and B groups exhibit failure. At over 3100 volts, no survivals from any group can be found. The behavior of voltage breakdown of A and B groups is quite similar, while C group indicates significantly different trends from A and B groups.

Figure 4:
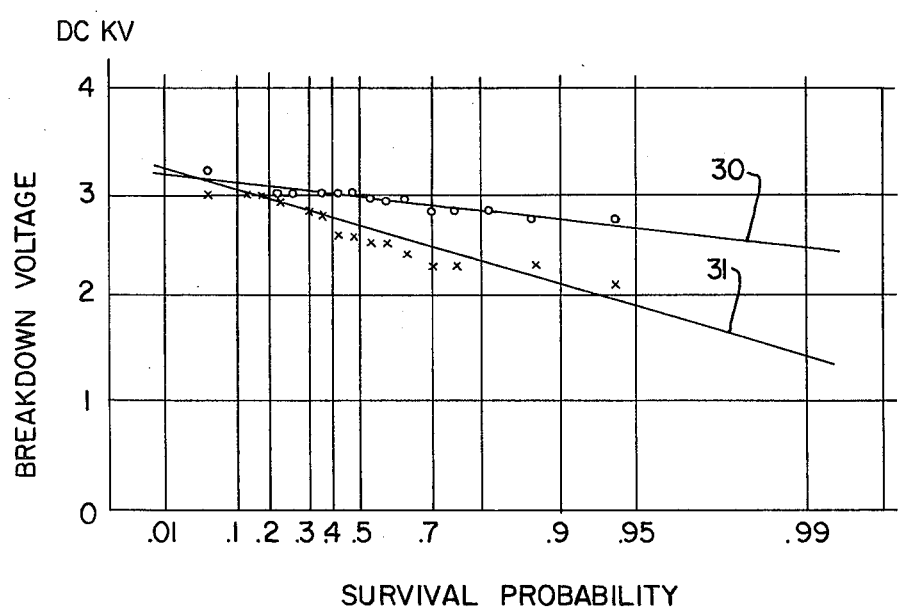
FIG. 4 shows the breakdown voltage characteristics of metallized polypropylene film capacitors made with dry wound body and wet wound body.

All of the voltage breakdown values obtained from A and C groups are plotted on the extreme-value paper, as illustrated in FIG. 4. In the figure, numeral 30 is a regression line for A group and numeral 31 for C group, and there can be seen the clearly different trend between A and C groups.

In order to find the reason why there is such an outstanding difference in stability, the clearing spots are examined in detail. The examination has disclosed that clearing spots of the units from A and B groups are more clean than those from C group. There is no evidence of degradation of impregnant around the site of clearing spots in A and B groups. While in C group, decomposed substances mainly from the impregnant can be detected. Those substances partially carbonized attach around the clearing spots and seem to cause the unstable voltage.

In addition to the improvement of the voltage stability for A and B groups, a high current stability is obtained in only A group.

Four capacitor units from each three groups are presented for a high current test. The current test is carried out in a way of a dead-short method. Each unit is charged up to about 250 volts and then is dead-shorted by a contacting switch connected across the unit terminals. Short current is observed with a synchroscope via a current shunt inserted into the dead-shorting circuit. A damped oscillation current with about 25 kolo Hz. ringing cycles, and 70% reversal rate generates 750 amperes peak in the first half cycle.

Prior to the current test, all the units are placed in a hot air oven kept at 100° C.±3° C. for 250 hours. The high current test, as mentioned above, is performed on the unit up to 10,000 times with every five seconds. After finishing the test, tan d at 1 kilo Hz. is measured and compared with the initial value. In comparison with the tan d change, there is a dramatic difference between A group and, B and C groups. Four units from A group exhibit a slight change of tan d increase less than 1%, while these changes from B and C groups show extremely large changes of tan d increase ranging from 5% up to infinity (open circuit). The reason for such high tan d change as B and C groups is examined by disassembling the units and unrolling the wound bodies. The examination reveals that the large tan d change is due to the poor contact between the sprayed metal and the electrode end. There can be found swelling of the metallized polypropylene film, especially at the end of the film, by absorbing the oil, eventually causes the poor contact.

Accordingly, the current stability of a metallized polypropylene capacitor strictly depends on the swelling action of an oil which attaches to the film. Thus, for obtaining good current stability it is necessary to employ an oil having weak swelling action against polypropylene film as the coolant. Vegetable oils, kinds of natural glyceride-esters, have such weak swelling action that they are suitable substances for this object. Moreover, they have fairly good electrical properties, when refined.

Petrochemical oils or synthetic hydrocarbon oils widely have strong swelling action, even though they have excellent electrical properties. Synthetic esters, derivatives from fatty acids, phthalic acids and phosphorus acids, have medium swelling action and medium electrical properties. These substances are not necessarily suitable for a coolant against a metallized polypropylene capacitor.

In this invention, vegetable oils such as cottonseed oil, corn oil, castor oil, linseed oil, peanut oil, rapeseed oil, rice oil, soybean oil, sunflower oil, and other plant oils are preferably employed as a coolant.

Although various minor modification might be suggested by those versed in the art, it should be understood that we wish to embody within the scope of the patent awarded hereon all such modification as reasonably and properly come within the scope of our contribution to the art.

We claim as our invention:

1. A metallized polypropylene film capacitor comprising:
   a. a container and
   b. mounted within said container at least one wound body comprising concentric layers of metallized polypropylene film, with the layers of polypropylene alternating with layers of the metal employed to metallize said polypropylene,
   c. said at least one body containing within the space between the alternating layers of polypropylene and metal at least one electronegative gas occupying a majority of said space said electronegative gas not being combined with a liquid and in the remaining space within said container a coolant oil having little or no swelling effect on said polypropylene.

2. The capacitor according to claim 1 wherein said coolant oil is a vegetable oil.

3. The capacitor according to claim 2 wherein said vegetable oil is caster oil, cottonseed oil, corn oil, linseed oil, peanut oil, rapeseed oil, rice oil, soybean oil or sunflower oil.

4. The capacitor according to any one of claims 1, 2 or 3 wherein the electronegative gas is at least one of sulphur hexafluoride ($SF_6$), fluoromethane ($CF_4$), perfluorpropane ($C_3F_8$), perfluorodibutyne ($C_4F_6$), perfluorobutene ($C_4F_8$), trifluoromethane ($CHF_3$), chlorotrifluoromethane ($CClF_3$), bromotrifluoromethane ($CBrF_3$), or dichlorodifluoromethane ($CCl_2F_2$).

5. The capacitor accordng to claim 4 wherein the electronegative gas comprises $SF_6$.

6. The capacitor according to claim 4 wherein the electronegative gas further comprises an insulating gas.

7. The capacitor according to claim 6 wherein said insulating gas is nitrogen.

8. The capacitor according to claim 4 wherein said oil additionally contains electronegative gas dissolved therein.

9. The capacitor according to claim 8 wherein said oil is saturated with said electronegative gas.

10. The capacitor according to claim 9 wherein said electronegative gas is $SF_6$.

* * * * *